United States Patent [19]
Aoshima et al.

[11] Patent Number: 5,404,906
[45] Date of Patent: Apr. 11, 1995

[54] FUEL TANK

[75] Inventors: Kazuyuki Aoshima, Tokyo; Taiki Aoyama, Fujisawa, both of Japan

[73] Assignees: Nissan Motor Co., Ltd., Yokahama; Keeper Co., Ltd., Tokyo, both of Japan

[21] Appl. No.: 163,621

[22] Filed: Dec. 9, 1993

[30] Foreign Application Priority Data

| Dec. 21, 1992 | [JP] | Japan | 4-087129 U |
| Dec. 21, 1992 | [JP] | Japan | 4-087130 U |
| Dec. 21, 1992 | [JP] | Japan | 4-339370 |

[51] Int. Cl.⁶ .................... B65B 31/06; F16K 24/00
[52] U.S. Cl. .................... 137/587; 123/519; 141/59; 220/86.2; 220/746
[58] Field of Search ........... 137/587, 588; 141/59; 220/86.2, 746, 749; 123/519

[56] References Cited

U.S. PATENT DOCUMENTS

| 4,706,708 | 11/1987 | Fornuto et al. | 137/588 |
| 4,809,863 | 3/1989 | Woodcock et al. | 220/86.2 X |
| 4,926,914 | 5/1990 | Morizumi et al. | 137/588 X |
| 4,932,444 | 6/1990 | Micek | 137/588 X |
| 4,941,587 | 7/1990 | Terada | 220/86.2 X |
| 4,966,299 | 10/1990 | Teets et al. | 137/588 X |
| 5,215,132 | 6/1993 | Kobayashi | 137/587 X |
| 5,263,511 | 11/1993 | Ohasi et al. | 137/588 |
| 5,282,497 | 2/1994 | Allison | 137/588 |

FOREIGN PATENT DOCUMENTS 2-100922  8/1990  Japan .

OTHER PUBLICATIONS

Patent Abstracts of Japan No. 4-356,227.

*Primary Examiner*—John Rivell
*Attorney, Agent, or Firm*—Lowe, Price, LeBlanc & Becker

[57] ABSTRACT

A fuel tank includes a vent cutout valve having a first chamber connected to a vent tube, a second chamber communicating with a canister and a third chamber connected to an evaporation tube. The first and second chambers are defined by a first partition wall with a first communication bore and the second and third chambers are defined by a second partition wall with a second communication bore. A main body of the vent cutout valve is disposed within the second chamber to open the first communication bore when a shutter presses the main body of the vent cutout valve, and is provided with a check valve to close the second communication bore which is biased toward the second partition wall by a resilient member interposed between the check valve and the valve main body of the vent cutout valve.

7 Claims, 10 Drawing Sheets

FUEL TANK

BACKGROUND OF THE INVENTION

The present invention relates generally to a fuel tank for use in motor vehicles, etc. and more particularly, to an oil filler portion thereof.

Some fuel tanks for motor vehicles include a valve mounted to a filler tube for fuel supply. This valve may be provided with a vent tube for ensuring vent operation upon fuel supply or an evaporation valve for conducting evaporated fuel within the fuel tank to a canister. Arranged within a valve main body is a shaft which has an end projecting into the filler tube. Upon fuel supply, by insertion of a nozzle of an oil gun into the filler tube, a shutter within the filler tube is opened, thereby pressing the shaft to open the valve main body. For further information, see, for example, JP-U 2-100922.

With such conventional fuel tanks, however, there arise the following problems:

Upon fuel supply, if a tank main body is supplied with a large amount of fuel, a pressure within the tank main body is increased. When this pressure exceeds a pressure for opening a check valve, the check valve is opened, and thus the evaporation tube is opened. With the evaporation tube opened, a fuel level which is rising upon fuel supply cannot be restrained by a level restraint valve, resulting in fuel oversupply exceeding a predetermined level. For solving this problem, a shutout valve can be provided to the evaporation tube in the vicinity of the check valve so as to be closed when detecting insertion of the nozzle of the oil gun. However, it is necessary to provide the shutout valve and an apparatus for detecting an inserted state of the nozzle of the oil gun, resulting in complicated constitution and increased manufacturing cost.

Further, with regard to a valve seal for the conventional fuel tanks, it is difficult to weld to the cylindrical filler tube a flat base plate on all periphery thereof, requiring a lot of working time. Moreover, due to sealing separately carried out in two portions between the filler tube and the base plate, and between the base plate and a bracket, possible leakage is increased, requiring high accuracy welding, etc. for improving a reliability, resulting in an increase in manufacturing cost.

Still further, if fuel supply is carried out with the shutter not fully opened due to a insufficient insertion amount of the nozzle of the oil gun, fuel is supplied with the vent cutout valve out of operation. Thus, vent operation by the vent cutout valve fails to be ensured, so that a level restraint fails to be carried out when the fuel tank is full, resulting in impossibility of ensuring an air chamber in the upper portion of the tank main body. Moreover, if fuel supply is carried out with the nozzle of the oil gun incompletely inserted, nonexecution of a level restraint causes a relief valve to open every fuel supply when the fuel tank is full, increasing a load applying to the tank main body.

It is, therefore, an object of the present invention to provide a fuel tank which allows correct fuel supply without any leakage and increase in manufacturing cost.

SUMMARY OF THE INVENTION

According to one aspect of the present invention, there is provided a fuel tank provided with a vent tube and an evaporation tube and connected to a canister through a conduction tube, comprising:
- a filler tube having a nozzle receiving portion for receiving a nozzle of an oil gun;
- a shutter arranged in said nozzle receiving portion of said filler tube, said shutter being opened by insertion of said nozzle of said oil gun; and
- a vent cutout valve mounted to the filler tube, said vent cutout valve having a main body with a shaft which cooperates with said shutter to open and close the conduction tube, said vent cutout valve having a first chamber connected to said vent tube, a second chamber communicating with the canister and a third chamber connected to the evaporation tube, said first and second chambers being defined by a first partition wall with a first communication bore and said second and third chambers being defined by a second partition wall with a second communication bore, said main body of said vent cutout valve being disposed within said second chamber to open said first communication bore when said shutter presses said main body of said vent cutout valve.

According to another aspect of the present invention, there is provided a fuel tank provided with a filler tube having a nozzle receiving portion for receiving a nozzle of an oil gun and a shutter arranged in the nozzle receiving portion of the filler tube wherein the shutter is opened by insertion of the nozzle of the oil gun, the fuel tank comprising:
- at least one seal arranged in the nozzle receiving portion of the filler tube to contact the nozzle of the oil gun;
- means for defining a bypass passage communicating with the oil filler port side of the filler tube, said bypass passage defining means being disposed in the nozzle receiving portion and between one of said at least one seal on a downstream side of the filler tube and the shutter; and
- a relief valve arranged in said bypass passage defining means, said relief valve being opened with a pressure lower than a pressure for opening the shutter.

DETAILED DESCRIPTION OF THE INVENTION

Referring to FIGS. 1 to 4, there is shown a first preferred embodiment of the present invention.

Figure 4:
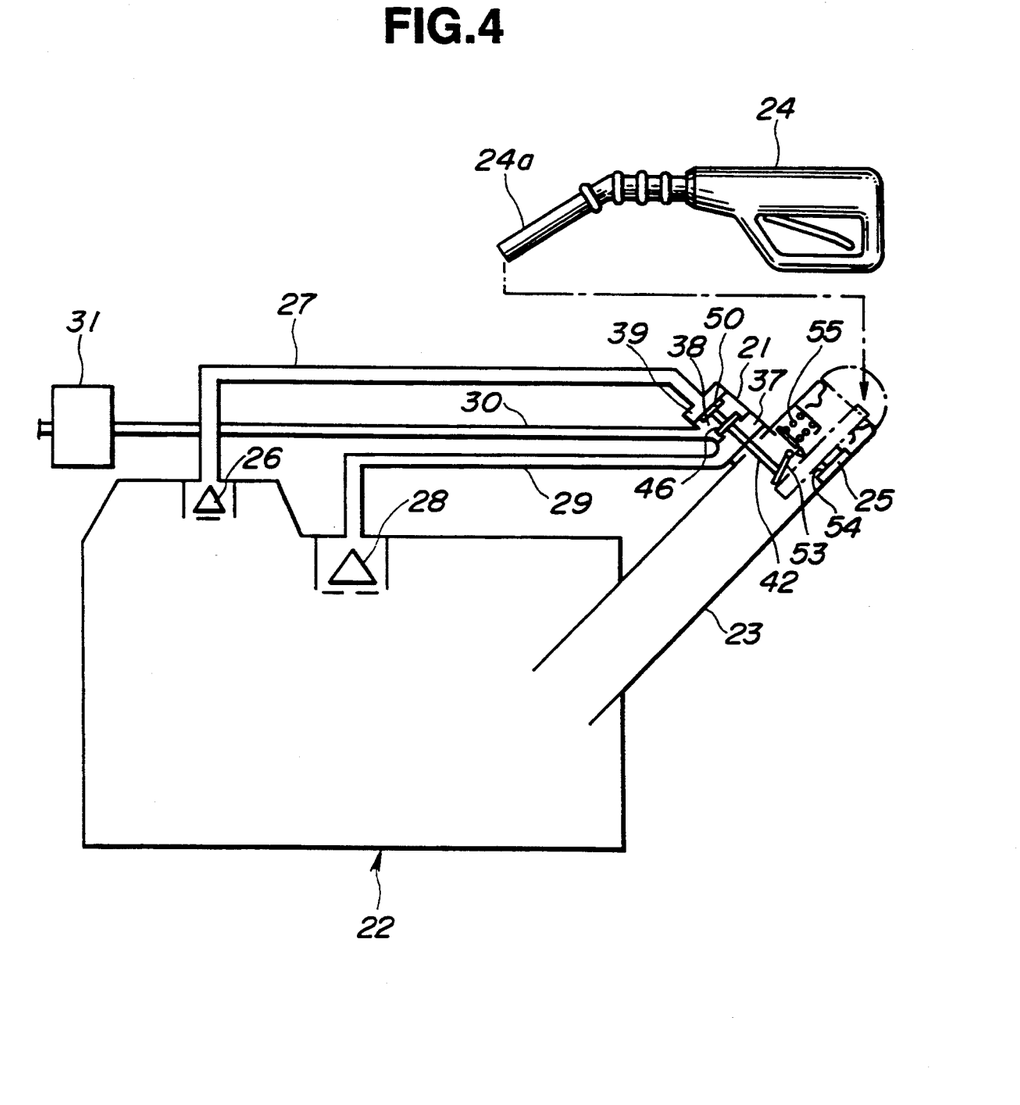
FIG. 4 is a schematic drawing showing a fuel tank.

Referring first to FIG. 4, a description will be made with regard to a general constitution of a fuel tank provided with a vent cutout valve 21.

The fuel tank, designated by reference numeral 22, is provided with a filler tube 23 for fuel supply. Arranged to the filler tube 23 in the upper portion thereof is a gun receiving portion 25 for receiving a nozzle 24a of an oil gun 24. The vent cutout valve 21 is mounted to the filler tube 23 in the portion thereof adjacent to the gun receiving portion 25.

Arranged to the fuel tank 22 in the upper wall thereof are an evaporation tube 27 having an end provided with an evaporation cutout valve 26, and a vent tube 29 having an end provided with a level restraint valve 28. The evaporation tube 27 and the vent tube 29 are connected to ports (which will be described later) of the vent cutout valve 21, respectively. Connected to a port (which will be described later) of the vent cutout valve 21 is a conduction tube 30 to which a canister 31 is connected for absorbing evaporated fuel.

Figure 1:
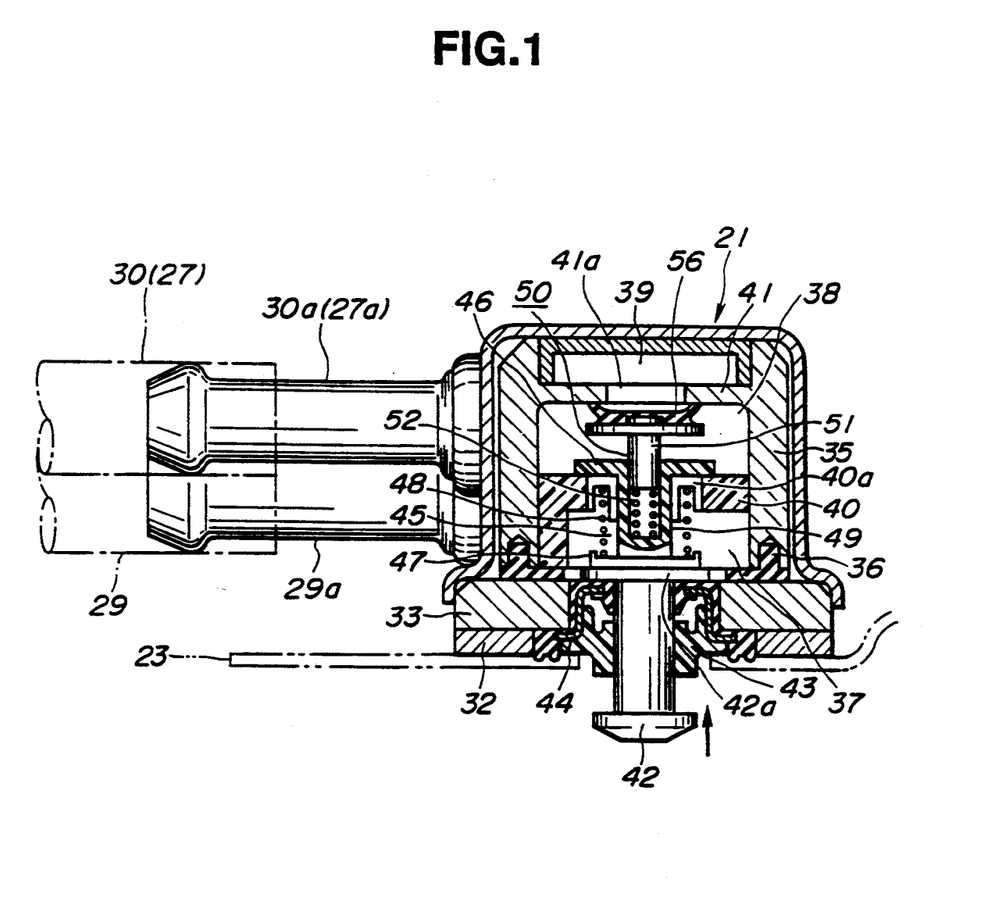
FIG. 1 is a sectional view showing a vent cutout valve.
Figure 2:
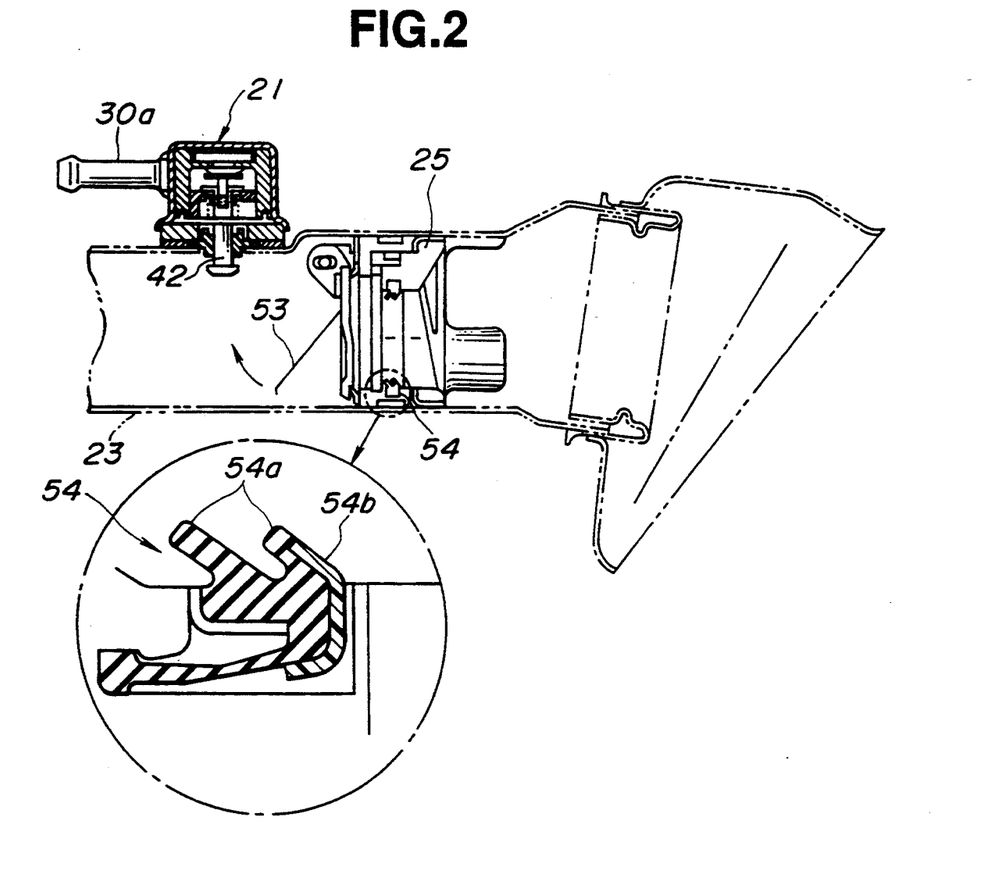
FIG. 2 is a side view showing the vent cutout valve mounted to a filler tube.
Figure 3:
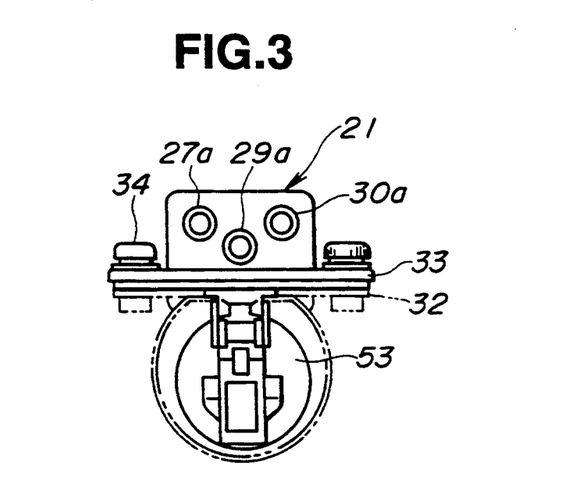
FIG. 3 is a front view showing the vent cutout valve.

Referring next to FIGS. 1 to 3, the vent cutout valve 21 will be described. A plate 32 is welded to the filler tube 23 to which the vent cutout valve 21 is mounted. The vent cutout valve 21 is secured thereto by bolts and nuts 34 through the plate 32 and the other plate 33.

Mounted to the plate 33 through a seal member 36 is a valve casing 35 of the vent cutout valve 21 which has from the side of the filler tube 23 a first chamber 37, a second chamber 38, and a third chamber 39. A lower partition wall 40 for defining the first and second chambers 37, 38 and an upper partition wall 41 for defining the second and third chambers 38, 39 are formed with communication bores 40a, 41a, respectively.

The first chamber 37 has a port 29a for connecting the vent tube 29, and the second chamber 38 has a port 30a for connecting the conduction tube 30, and the third chamber 39 has a port 27a for connecting the evaporation tube 27.

Arranged through the plates 32, 33 is a rod 42 as a shaft which has an end projecting into the filler tube 23. The rod 42 is slidably supported to a guide member 43, and has a head 42a which contacts a guide member 43 and a seal member 44 interposed between the plates 32, 33 so as to prevent the rod 42 from being off.

Disposed to the lower partition wall 40 within the second chamber 38 is a valve main body 46 which is arranged through a shaft 45 so as to open and close the communication bore 40a. The shaft 45 of the valve main body 46 has an end formed with a flange portion 47. Interposed between the flange portion 47 and the lower partition wall 40 is an exemplary compressible spring 48 serving as a resilient member for pressing the valve main body 46 to the lower partition wall 40 and the flange portion 47 of the end of the shaft 45 to the head 42a of the rod 42. The rod 42 and the shaft 45 may be integrated with each other.

The valve main body 46 is formed to be hollow with a shaft receiving portion 49 in the center thereof, into which a cylindrical shaft 51 of a check valve 50 for opening and closing the communication bore 41a of the upper partition wall 41 is inserted from the side of the second chamber 38, the shaft 51 being biased in the closed direction by an exemplary compressible spring 52 serving as a resilient member. A resilient seal member 56 made of rubber or the like is attached to the check valve 50 in the portion thereof closely contacting the upper partition wall 41.

As shown in FIG. 2, a shutter 53 is arranged in the gun receiving portion 25 of the filler tube 23 so as to open when inserting therein the nozzle 24a of the oil gun 24. The end of the rod 42 is located in the rotation range of the shutter 53.

A nozzle seal 54 made of rubber is arranged in the gun receiving portion 25. The nozzle seal 54 includes a pair of lip portions 54a extending in the inserted direction of the nozzle 24a of the oil gun 24. A guide member 54b made of resin or resilient metal is attached to the lip portion 54a on the oil filler port side of the filler tube 23 so as to prevent flawing of the lip portions 54a upon insertion of the nozzle 24a. It is to be noted that in FIG. 4, reference numeral 55 designates a relief valve.

Next, operation of this embodiment will be described. First, upon cruising, etc. of the motor vehicle, since the valve main body 46 of the vent cutout valve 21 closes the communication bore 40a of the lower partition wall 40, whereas the check valve 50 closes the communication bore 41a of the upper partition wall 41 as shown in FIG. 1, the evaporation tube 27 and the vent tube 29 are cut off.

If a pressure within the fuel tank 22 becomes higher due to increased evaporated fuel in the fuel tank 22, and thus a pressure within the third chamber 39 of the vent cutout valve 21 exceeds a pressure for opening the check valve 50 which is given by the resilient seal member 56 of the check valve 50 and the spring 52, the check valve 50 is opened. Thus, evaporated fuel within the fuel tank 22 is conducted from the conduction tube 30 to the canister 31 via the evaporation tube 27, and the third and second chambers 39, 38 of the vent cutout valve 21, so that a pressure within the fuel tank 22 is kept constant. Moreover, the check valve 50 is opened only when a pressure within the fuel tank 22 exceeds a predetermined value, resulting in restraint of a generation amount of evaporated fuel.

Next, upon fuel supply, when inserting the nozzle 24a of the oil gun 24 into the gun receiving portion 25 of the filler tube 23, the shutter 53 is opened to press the rod 42 of the vent cutout valve 21. With the rod 42 pressed, the shaft 45 of the valve main body 46 is pressed against the spring 48, so that the valve main body 46 opens the communication bore 40a of the lower partition wall 40. As a result, the first chamber 37 communicates with the second chamber 38, i.e., the vent tube 29 communicates with the conduction tube 30.

Therefore, if fuel supply is carried out in this state, high concentration evaporated fuel generated with an increased fuel level in the fuel tank 22 is conducted from the vent tube 29 to the canister 31 via the conduction tube 30 for absorption, and fails to flow out. Moreover, with the filler tube 23, the nozzle seal 54 of the gun receiving portion 25 ensures a sealing of the nozzle 24a of the oil gun 24 on the periphery thereof, so that evaporated fuel fails to flow out therefrom.

When a fuel level reaches the level restraint valve 28, the vent tube 29 is closed, so that evaporated fuel in an upper space of the fuel tank 22 is trapped therein. Thus, a fuel level within the filler tube 23 is increased, and the oil gun 24 is automatically stopped to end fuel supply.

Upon fuel supply, due to a fuel supply amount being greater than an amount of evaporated fuel discharged from the vent tube 29, a pressure within the fuel tank 22 may be increased. Conventionally, when a pressure within the fuel tank 22 is increased, and exceeds a pressure for opening the check valve 50 upon cruising of the motor vehicle, the check valve 50 is opened to discharge evaporated fuel in the upper space of the fuel tank 22. Therefore, a level restraint is not carried out by the level restraint valve 28, and a fuel level becomes higher than a predetermined value. However, with the valve main body 46 pressed up by insertion of the nozzle 24a of the oil gun 24, the spring 52 has largely increased biasing force, so that a pressure for opening the check valve 50 is higher, resulting in impossible opening of the check valve 50. Therefore, a fuel level is kept at a predetermined value.

Moreover, upon fuel supply, if the nozzle 24a of the oil gun 24 is inserted into the gun receiving portion 25 with great force, first, the shutter 53 is opened, and then the valve main body 46 is quickly opened by retraction of the rod 42. This quick motion is absorbed by buffer action of not only the spring 52, but the resilient seal member 56, so that the check valve 50 closes smoothly the communication bore 41a of the upper partition wall 41, resulting in alleviated impact to the check valve 50.

In such a manner, by mounting of the check valve 50 to the vent cutout valve 21, and effective use of a motion of the valve main body 46 opened by the nozzle 24a of the oil gun 24 upon fuel supply, a pressure for opening the check valve 50 is changed upon fuel supply. Therefore, it is unnecessary to provide, as in the prior art, not only a shutout valve for detecting an inserted state of the nozzle of the oil gun to close the evaporator tube, but an apparatus for detecting an inserted state of the nozzle of the oil gun, resulting in a reduced manufacturing cost.

Referring to FIGS. 6 to 11, there is shown a second preferred embodiment of the present invention.

Figure 5:
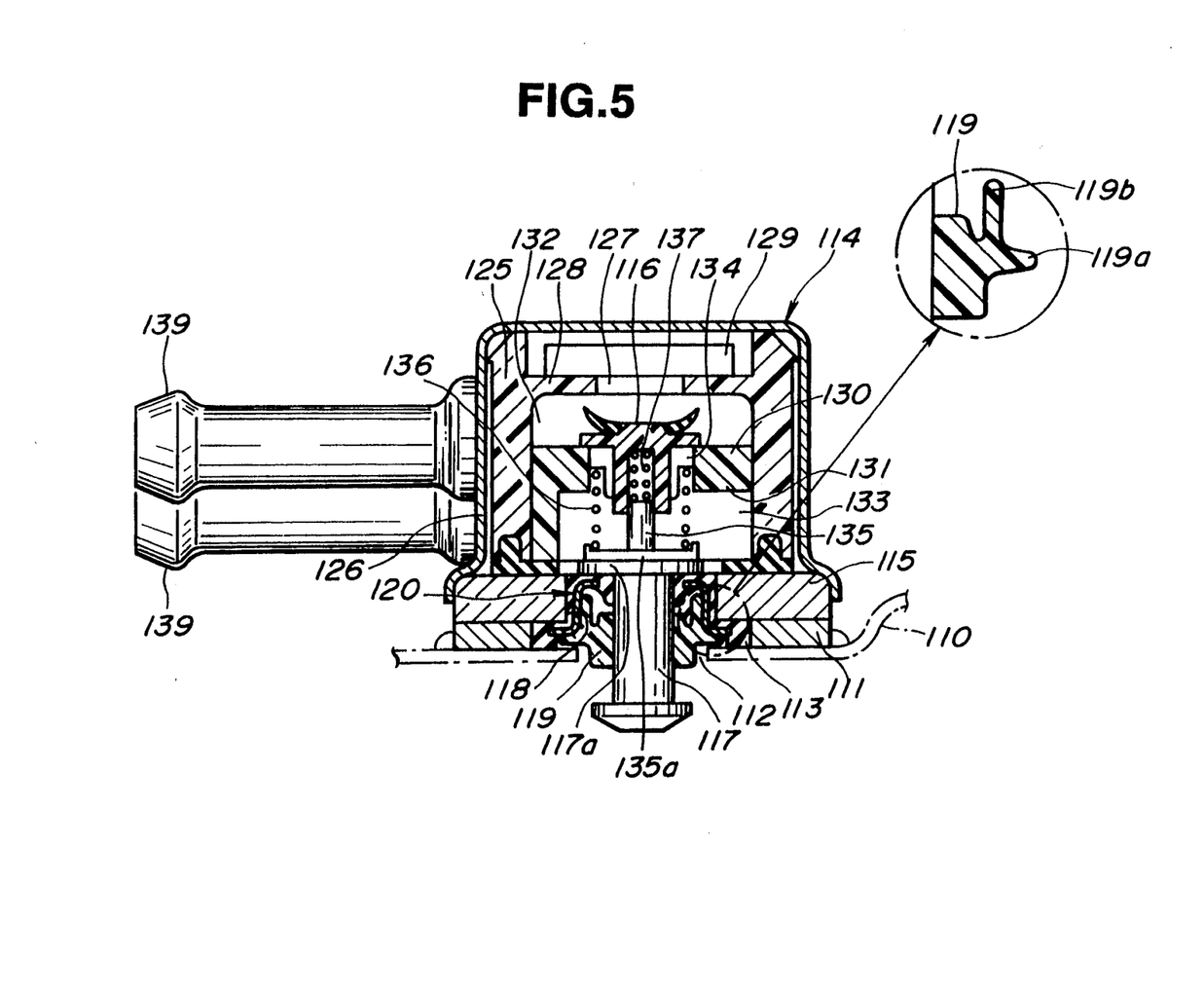
FIG. 5 is a view similar to FIG. 1, showing a seal member.
Figure 6:
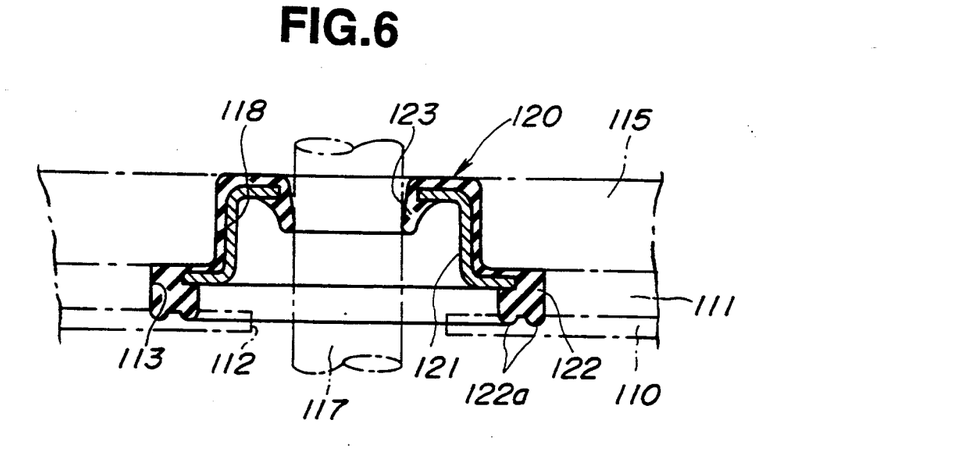
FIG. 6 is an enlarged section showing the seal member.

Referring to FIG. 5, a filler tube, designated by reference numeral 110, is mounted to a base plate 111 by soldering. It is to be noted that soldering is partly carried out between the filler tube 110 and the base plate 111.

The filler tube 110 and the base plate 111 are formed with shaft bores 112, 113 for receiving a shaft 117 of a valve main body 116 as will be described later, the shaft bore 112 of the filler tube 110 being smaller than the shaft bore 113 of the base plate 111. The base plate 111 and a bracket 115 of a vent cutout valve 114 are secured by bolts (not shown) together with a cover 126 as will be described later.

The bracket 115 of the vent cutout valve 114 is formed with a shaft bore 118 for receiving the shaft 117 of the valve main body 116, which is smaller than the shaft bore 113 of the base plate 111. A seal member 120 is installed to the shaft bores 112, 113, 118 through a collar 119 arranged through the shaft 117.

Figure 8:
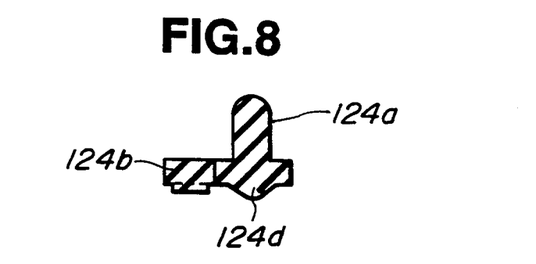
FIG. 8 is a view similar to FIG. 6, taken along the line VIII—VIII in FIG. 7.

Referring to FIG. 8, the seal member 120 is an annular member disposed along the inner periphery of the shaft bores 113, 118 and having a crank-shaped section, and includes a metal core 121 with a crank-shaped section and a rubber molded therein. Arranged to the core 121 in the lower portion thereof is a main seal portion 122 which is held between an outer peripheral face of the filler tube 110 or a peripheral edge of the shaft bore 112, and a lower side of the bracket 115 or a peripheral edge of the shaft bore 118, whereas arranged to the core 121 in the upper portion thereof is a shaft seal member 123 which is connected to the main seal portion 122 on the outer periphery of the core 121, and is in contact with the outer periphery of a base of the shaft 117. A pair of protrusions 122a are arranged to the main seal portion 122 on the lower side thereof so as to increase contact force to the filler tube 110.

As shown in FIG. 5, the collar 119 has a flange portion 119a inserted between the lower side of the core 121 of the seal member 120 and the outer peripheral face of the filler tube 110 or the peripheral edge of the shaft bore 112, and a tubular portion 119b which is in contact with an inner peripheral face of the core 121 of the seal member 120.

The shaft 117 is arranged through the shaft bores 112, 113, 118, and has an end projecting into the filler tube 110, and a base formed with a flange portion 117a which is held on an upper portion of the seal member 120 for preventing the shaft 117 from being off.

Figure 7:
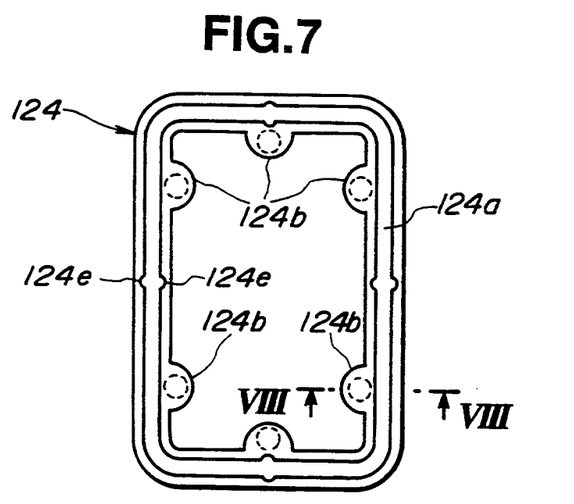
FIG. 7 is a plan view showing a packing.

A casing lid 125 is disposed on an upper side of the bracket 115 of the vent cutout valve 114 through a rectangular packing 124 as shown in FIG. 7, and is fixed by a cover 126 as shown in FIGS. 7 and 8 which is secured to the bracket 115 and the base plate 111 by bolts (not shown) for concealing the casing lid 125 from the outside.

A partition wall 128 having a communication bore 127 is arranged to the casing lid 125 in the upper portion thereof so as to define a third chamber 129 in the upper portion of the casing lid 125. A partition member 130 is inserted in the casing lid 125, and includes a partition wall 131 having a communication bore 134, by which second and first chambers 132, 133 are defined.

A flange portion 135a of a connecting shaft 135 is in contact with the flange portion 117a of the shaft 117, and a spring 136 for biasing the shaft to the filler tube 110 is interposed between the flange portion 135a of the connecting shaft 135 and the partition wall 131.

Mounted to the connecting shaft 135 at the end thereof is a valve main body 116 which is located in the second chamber 132, and serves to close the communication bore 134 and open the communication bore 127 in a normal condition, and to open the communication bore 134 and close the communication bore 127 upon fuel supply since the shaft 117 is pressed by the nozzle of the oil gun. A spring 137 is interposed between the valve main body 116 and the connecting shaft 135.

Figure 9:
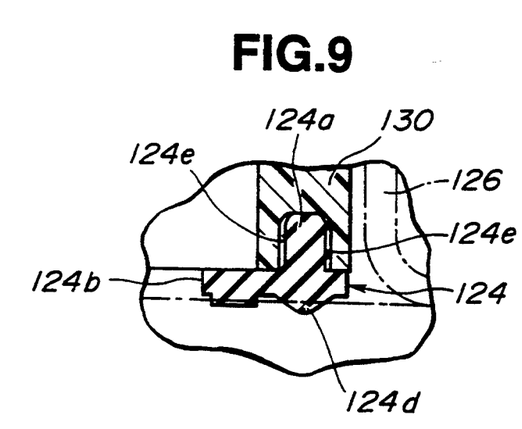
FIG. 9 is a view similar to FIG. 8, showing the packing installed.

Referring to FIGS. 7 to 9, the packing 124 is formed with a convex portion 124a on all periphery thereof to be engaged with a groove of the casing lid 125, and inner protrusions 124b on the inside thereof. The protrusions 124b serve to receive a lower end of the partition member 130 for supporting the partition member 130 and the casing lid 125 without looseness, increasing sealing performance of the valve main body 116.

The convex portion 124a has in the lower portion thereof a lower protrusion 124d for increasing contact force of the packing 124 to the bracket 115, and on inner and outer peripheries thereof thick spots 124e.

Figure 10:
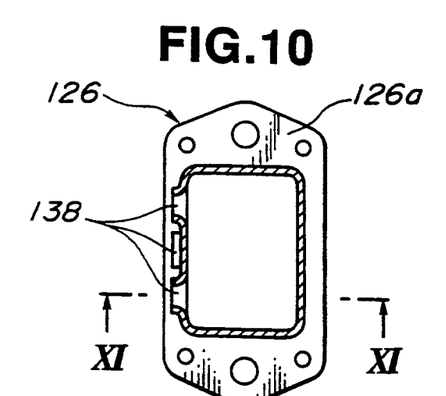
FIG. 10 is a view similar to FIG. 7, taken along the line X—X in FIG. 11.
Figure 11:
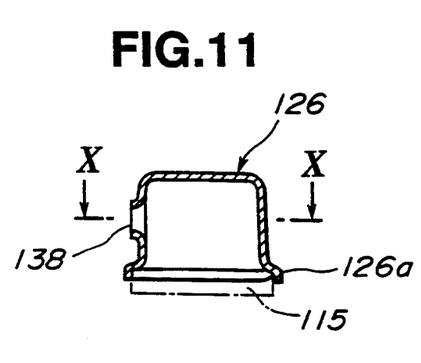
FIG. 11 is a view similar to FIG. 9, taken along the line XI—XI in FIG. 10.

Referring to FIGS. 10 and 11, the cover 26 has in the lower portion thereof a flange portion 126a, and on the side thereof a boss portion 138 formed outward to communicate with the first, second and third chambers 129, 132, 133 through a seal portion (not shown), the boss portion 138 enabling prevention of flawing of the casing lid 125, etc. which may be produced if the boss portion is formed inward, and facilitating welding of ports 139 to be fixed to the boss portion 138. Moreover, a mounting flange portion 126a of the cover 126 has an outer peripheral edge formed to conceal a part of the outer periphery of the bracket 115, minimizing a relative movement of the cover 126 with the casing lid 125 upon collision of the motor vehicle, thus preventing internal breakage.

The third chamber 129 communicates with the port 139 to which the evaporation tube is connected, and the second chamber 132 communicates with the port 139 to which the conduction tube communicating with the canister is connected, and the first chamber 132 communicates with the port 139 to which the vent tube is connected.

According to this embodiment, since the main seal portion 122 of the seal member 120 is held between the filler tube 110 and the bracket 115, fuel within the filler tube 110 can be prevented from leaking between the filler tube 110 and the base plate 111, and between the base plate 111 and the bracket 115. Therefore, it is unnecessary to provide an O-ring between the base plate 111 and the bracket 115, and weld to the filler tube 110 the base plate 111 on all periphery thereof as in the prior art, resulting in largely reduced manufacturing cost.

Moreover, the shaft seal portion 124 contacting the outer periphery of shaft 117 is integrally formed with the main seal portion 123, resulting in easy assembling work. As compared with the conventional seal structure which needs to weld to the base plate 111 the filler tube 110 on all periphery thereof, this seal structure which only needs to weld partly the base plate 111 to the filler tube 110 presents scarcely heat deformation due to welding, and thus it is completely free from a defect due to the base plate 111 deformed.

It is to be noted that the core 121 of the seal member 120 may be made of rubber.

Referring to FIGS. 12 to 17, there is shown a third preferred embodiment of the present invention.

Figure 12:
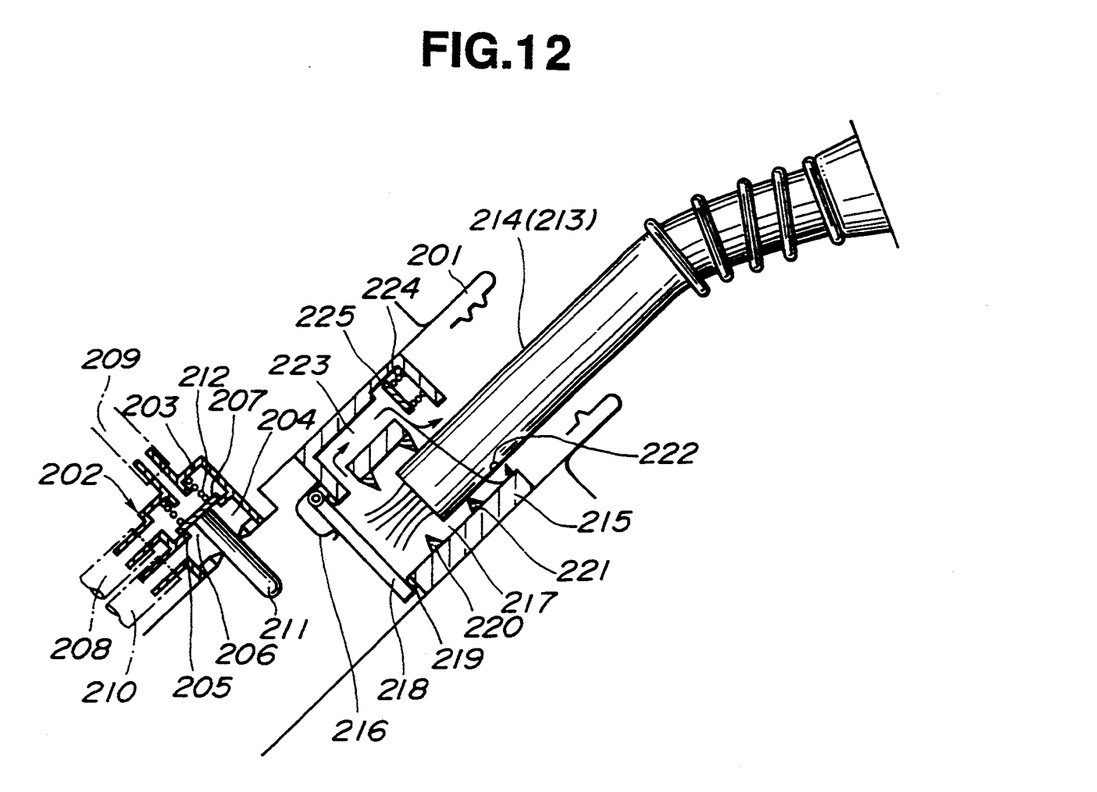
FIG. 12 is a diagrammatic section showing an imperfectly inserted state of a nozzle of an oil gun inserted into the filler tube.

Referring to FIG. 12, a vent cutout valve 202 is arranged to a filler tube 201 of the fuel tank. The vent cutout valve 202 has an upper and lower chambers 203, 204 defined by a partition wall 205 having a communication bore 206. A valve main body 207 is arranged in the communication bore 206. Connected to the upper chamber 204 are a conduction tube 208 extending to the canister and an evaporation tube 209, whereas connected to the lower chamber 204 is a vent tube 210. A rod 211 of the valve main body 207 has an end projecting into the filler tube 201 so as to interfere with an opening and closing locus of a shutter 218 (which will be described later). The valve main body 207 closes through a spring 212 the communication bore 206 normally, and the evaporation tube 209 when the rod 211 is pressed.

The filler tube 201 has a receiving portion 215 of a nozzle 214 of an oil gun 213 above a mounting site of the vent cutout valve 202. The shutter 218 is supported in the receiving portion 215 at the end thereof on the side of the inserted direction of the nozzle 218, and is biased in the direction of closing a receiving passage 217 by a spring 216. Reference numeral 219 designates a seal member which contacts the shutter 218 upon closing thereof.

Two nozzle seals 220, 221 are arranged in the receiving passage 217 of the receiving portion 215 in a predetermined position and at a predetermined interval so as to contact the periphery of the nozzle 214. The nozzle seals 220, 221 are disposed so that an auto-stop sensor 222 is located between the nozzle seals 220, 221 at least during a period of time from a point that the shutter 218 begins to be opened by the nozzle 214 being inserted to a point immediately before the shutter 218 is fully opened.

That is, the nozzle seal 220 is arranged outside a position of the auto-stop sensor 222 when the shutter 218 begins to be opened, whereas the nozzle seal 221 is arranged corresponding to a position of the auto-stop sensor 222 immediately before the shutter 218 is fully opened.

Therefore, a distance between the nozzle seals 220, 221 is substantially equal to or greater than a stroke of the nozzle 214 from a start of opening of the shutter 218 to an end of opening thereof. Such disposition allows the auto-stop sensor 222 not to be located between the nozzle seals 220, 221 when inserting the nozzle 214 completely, enabling fuel supply.

The receiving portion 215 has between the nozzle seal 220 downstream of the filler tube 201 and the shutter 218 a bypass passage 223 which branches from the receiving passage 217 and communicates with the oil filler port side. Arranged in the bypass passage 223 is a relief valve 225 which is biased in the closed direction by a spring 224, and opened at a lower pressure than that one for opening the shutter 218.

Figure 17:
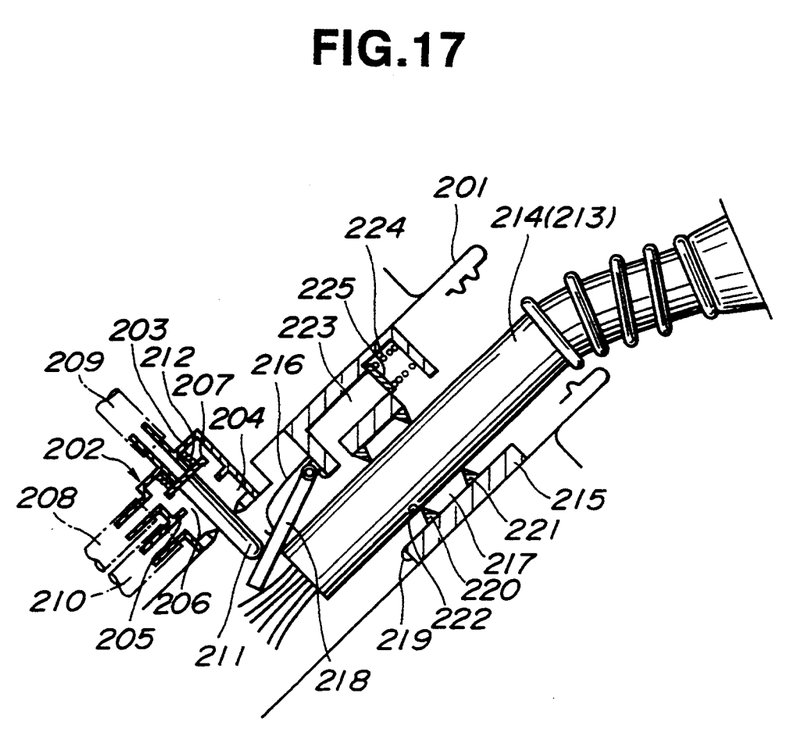
FIG. 17 is a view similar to FIG. 16, showing a properly inserted state of the nozzle.

Next, operation of this embodiment will be described. FIG. 17 shows a case of inserting the nozzle 214 of the oil gun 213 completely. If the nozzle 214 is completely inserted into the receiving portion 215, the shutter 218 is opened to press up the rod 211 of the valve main body 207. Thus, the valve main body 207 which has closed the communication bore 206 opens same, and closes the evaporation tube 209. Therefore, a vent course from the vent tube 210 to the conduction tube 208 is ensured, enabling fuel supply.

However, if the nozzle 214 is imperfectly inserted into the receiving portion 215 as shown in FIGS. 12 to 16, it can be known whether or not an inserted state of the nozzle 21 is abnormal according to the following methods:

Referring to FIG. 12, a description will be made with regard to an imperfectly inserted state in which the nozzle 214 is sealed only by the nozzle seal 221, and the auto-stop sensor 222 is located closer to the oil filler port side than the nozzle seal 221, and the end of the nozzle 214 fails to reach the shutter 218. In this case, since the receiving passage 217 is shut off by the shutter 218, supplied fuel is directed to the bypass passage 223 so as to open the relief valve 225 having an opening pressure lower than that of the shutter 218. With the relief valve 225 opened, fuel returns to the oil filler port side, and reaches the auto-stop sensor 222 of the nozzle 214. Thus, fuel supply is automatically stopped, enabling recognition that an inserted state of the nozzle 214 is abnormal.

Figure 13:
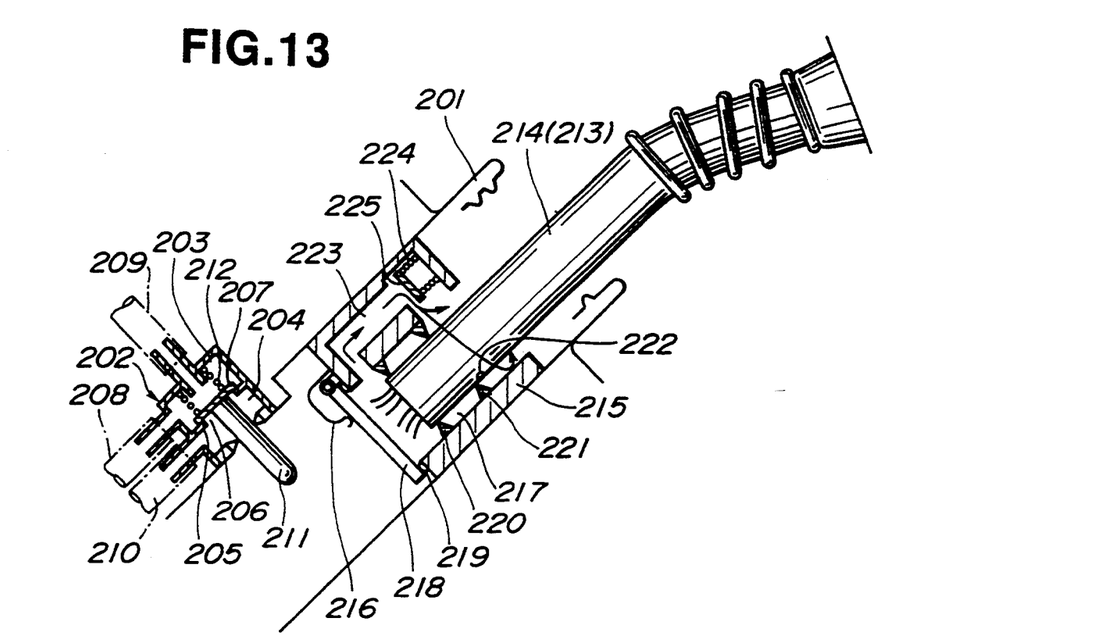
FIG. 13 is a view similar to FIG. 12, showing another imperfectly inserted state of the nozzle.

Referring to FIG. 13, if the nozzle 214 is sealed both of the nozzle seals 220, 221, and the auto-stop sensor 222 is located closer to the oil filler port side than the nozzle seal 221, and the end of the nozzle 214 fails to reach the shutter 218, supplied fuel is directed to the bypass passage 223 so as to open the relief valve 225, then returns to the oil filler port side and reaches the auto-stop sensor 222 in the same manner as the case in FIG. 12. Thus, fuel supply is automatically stopped, enabling recognition that an inserted state of the nozzle 214 is abnormal.

Figure 14:
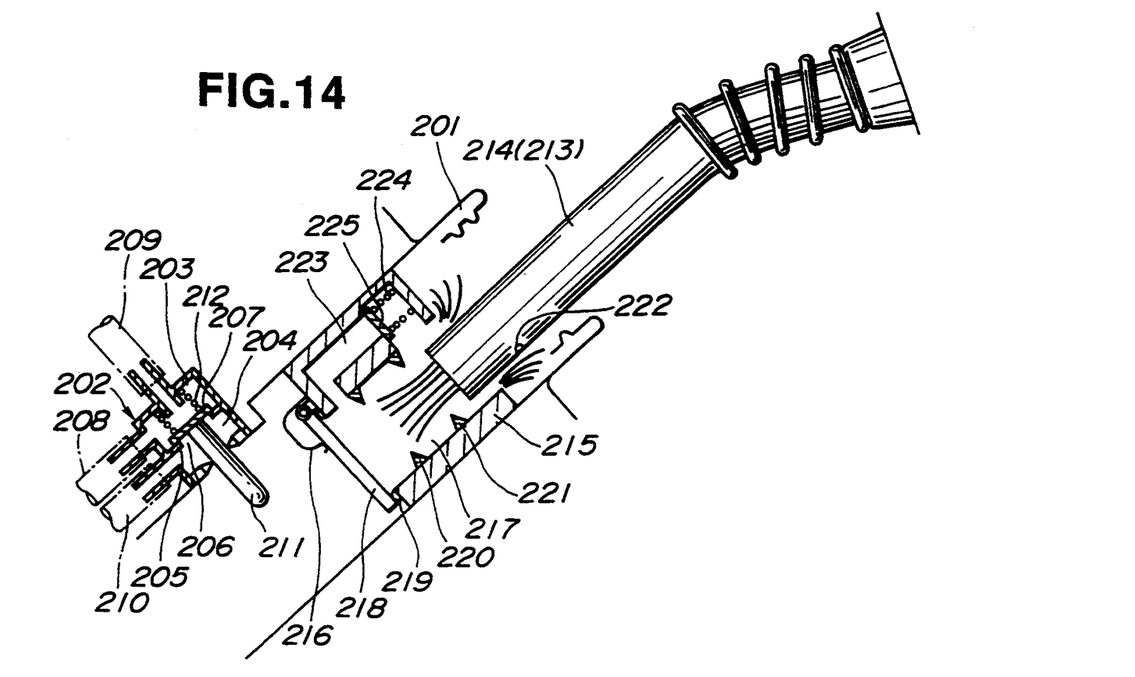
FIG. 14 is a view similar to FIG. 13, showing still another imperfectly inserted state of the nozzle.

Referring to FIG. 14, if the nozzle 214 fails to reach the nozzle seal 221, i.e., is in a shallowly inserted state, supplied fuel returns to the oil filler port side through a clearance between the nozzle 214 and the receiving passage 217, and reaches the auto-stop sensor 222, so that fuel supply is automatically stopped, enabling recognition that an inserted state of the nozzle 214 is abnormal.

Figure 15:
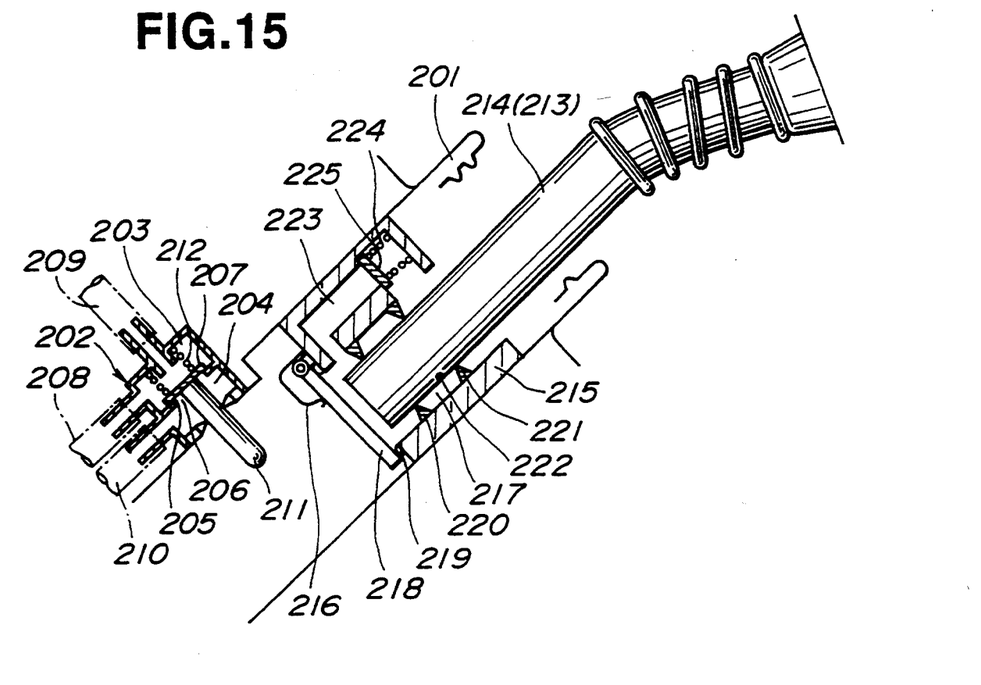
FIG. 15 is a view similar to FIG. 14, showing the other imperfectly inserted state of the nozzle.

Referring to FIG. 15, a description will be made with regard to a case that the nozzle 214 is inserted up to the same depth as FIG. 15, and the auto-stop sensor 222 is located between the nozzle seals 220, 221. In this case, the auto-stop sensor 222 is located in a space closed by the nozzle seals 220, 221. Thus, after starting fuel supply, the environment of the auto-stop sensor 222 has a negative pressure immediately, which is detected by the auto-stop sensor 222, so that fuel supply is automatically stopped before substantial execution, enabling recognition that an inserted state of the nozzle 214 is abnormal.

Figure 16:
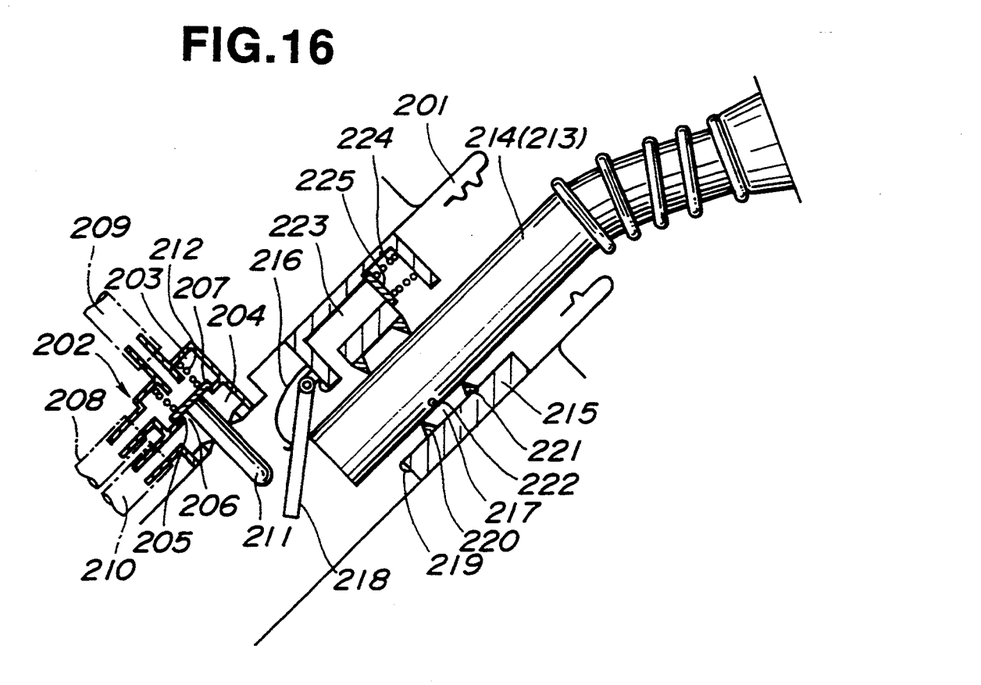
FIG. 16 is a view similar to FIG. 15, showing still another imperfectly inserted state of the nozzle.

Referring to FIG. 16, a description will be made with regard to a case that the nozzle 214 is sealed by the nozzle seals 220, 221, and the end of the nozzle 214 presses and opens the shutter 218 which fails to operate the vent cutout valve 202, and the auto-stop sensor 222 is located between the nozzle seals 220, 221. In this case, the auto-stop sensor 222 is located in the space closed by the nozzle seals 220, 221 in the same manner as the case in FIG. 15, so that after starting fuel supply, the environment of the auto-stop sensor 222 has a negative pressure immediately, operating the auto-stop sensor 222. Therefore, fuel supply is automatically stopped before substantial execution, enabling recognition that an inserted state of the nozzle 214 is abnormal.

In such a manner, not only in an imperfectly inserted state in which the nozzle 214 is inserted up to the nozzle seals 220, 221, but fails to open the shutter 218, but in the other imperfectly inserted states, fuel supply is automatically stopped by the auto-stop sensor 222, enabling recognition that an inserted state of the nozzle 214 is abnormal.

What is claimed is:

1. A fuel tank provided with a vent tube and an evaporation tube and connected to a canister through a conduction tube, comprising:

a filler tube having a nozzle receiving portion for receiving a nozzle of an oil gun;

a shutter arranged in said nozzle receiving portion of said filler tube, said shutter being opened by insertion of said nozzle of said oil gun;

a vent cutout valve mounted to the filler tube, said vent cutout valve having a main body with a shaft which cooperates with said shutter to open and close the conduction tube, said vent cutout valve having a first chamber connected to said vent tube, a second chamber communicating with the canister and a third chamber connected to the evaporation tube, said first and second chambers being defined by a first partition wall with a first communication bore and said second and third chambers being defined by a second partition wall with a second communication bore, said main body of said vent cutout valve being disposed within said second chamber to open said first communication bore when said shutter presses said main body of said vent cutout valve;

a check valve arranged to said main body of said vent cutout valve, said check valve cooperating with said main body of said vent cutout valve to close said second communication bore; and a resilient member interposed between said main body of said vent cutout valve and said check valve, said resilient member serving to bias said check valve toward said second partition wall.

2. A fuel tank as claimed in claim 1, further comprising:

a bracket;

a base plate interposed between said filler tube and said bracket, said shaft of said valve main body being arranged through said bracket, said base plate and said filler tube to project into said filler tube; and a seal member interposed between said filler tube on the periphery of shaft bores thereof and said bracket on the periphery of a shaft bore thereof.

3. A fuel tank as claimed in claim 1, further comprising:

at least one seal arranged in said nozzle receiving portion of said filler tube to contact said nozzle of said oil gun;

means for defining a bypass passage communicating with an oil filler port side of said filler tube, said bypass passage defining means being disposed in said nozzle receiving portion and between one of said at least one seal on a downstream side of said filler tube and said shutter; and a relief valve arranged in said bypass passage defining means, said relief valve being opened with a pressure lower than a pressure for opening said shutter.

4. A fuel tank provided with a filler tube having a nozzle receiving portion for receiving a nozzle of an oil gun and a shutter arranged in the nozzle receiving portion of the filler tube wherein the shutter is opened by insertion of the nozzle of the oil gun, the fuel tank comprising:

at least one seal arranged in the nozzle receiving portion of the filler tube to contact the nozzle of the oil gun;

means for defining a bypass passage communicating with an oil filler port side of the filler tube, said bypass passage defining means being disposed in the nozzle receiving portion and between one of said at least one seal on a downstream side of the filler tube and the shutter; and a relief valve arranged in said bypass passage defining means, said relief valve being opened with a pressure lower than a pressure for opening the shutter.

5. A fuel tank provided with a vent tube and an evaporation tube and connected to a canister through a conductive tube, comprising:

a filler tube having a nozzle receiving portion for receiving a nozzle of an oil gun;

a shutter arranged in said nozzle receiving portion of said filler tube, said shutter being opened by insertion of said nozzle of said oil gun;

a vent cutout valve mounted to the filler tube, said vent cutout valve having a main body with a shaft which cooperates with said shutter to open and close the conduction tube, said vent cutout valve having a first chamber connected to said vent tube, a second chamber communicating with the canister and a third chamber connected to the evaporation tube, said first and second chambers being defined by a first partition wall with a first communication bore and said second and third chambers being defined by a second partition wall with a second communication bore, said main body of said vent cutout valve being disposed within said second chamber to open said first communication bore when said shutter presses said main body of said vent cutout valve, wherein said main body of said vent cutout valve is provided with a check valve to close said second communication bore, said check valve being biased toward said second partition wall by a resilient compressible spring interposed between said check valve and said valve main body of said vent cutout valve.

6. A fuel tank provided with a vent tube and an evaporation tube and connected to a canister through a conduction tube, comprising:
- a filler tube having a nozzle receiving portion for receiving a nozzle of an oil gun;
- a shutter arranged in said nozzle receiving portion of said filler tube, said shutter being opened by insertion of said nozzle of said oil gun;
- a vent cutout valve mounted to the filler tube, said vent cutout valve having a main body with a shaft which cooperates with said shutter to open and close the conduction tube, said vent cutout valve having a first chamber connected to said vent tube, a second chamber communicating with the canister and a third chamber connected to the evaporation tube, said first and second chambers being defined by a first partition wall with a first communication bore and said second and third chambers being defined by a second partition wall with a second communication bore, said main body of said vent cutout valve being disposed within said second chamber to open said first communication bore when said shutter presses said main body of said vent cutout valve;
- at least one seal arranged in said nozzle receiving portion of said filler tube to contact said nozzle of said oil gun;
- means for defining a bypass passage communicating with an oil filler port side of said filler tube, said bypass passage defining means being disposed in said nozzle receiving portion and between one of said at least one seal on a downstream side of said filler tube and said shutter; and
- a relief valve arranged in said bypass passage defining means, said relief valve being opened with a pressure lower than a pressure for opening said shutter.

7. A fuel tank provided with a vent tube and an evaporation tube and connected to a canister through a conduction tube, comprising:
- a filler tube having a nozzle receiving portion for receiving a nozzle of an oil gun;
- a shutter arranged in said nozzle receiving portion of said filler tube, said shutter being opened by insertion of said nozzle of said oil gun;
- a vent cutout valve mounted to the filler tube, said vent cutout valve having a main body with a hollow cylindrical shaft which cooperates with said shutter to open and close the conduction tube, said vent cutout valve having a first chamber connected to said vent tube, a second chamber communicating with the canister and a third chamber connected to the evaporation tube, said first and second chambers being defined by a first partition wall with a first communication bore and said second and third chambers being defined by a second partition wall with a second communication bore, said main body of said vent cutout valve being disposed within said second chamber to open said first communication bore when said shutter presses said main body of said vent cutout valve, said main body of said vent cutout valve being provided with a check valve having a cylindrical stem slidable within said hollow cylindrical shaft of said main body to close said second communication bore, said check valve being biased toward said second partition wall by a resilient member interposed between said check valve and said valve main body of said vent cutout valve.

* * * * *